United States Patent
Marks (10) Patent No.: US 10,091,732 B2
(45) Date of Patent: *Oct. 2, 2018

(54) ENHANCED POWER CONSERVATION FOR MOBILE DEVICES

(71) Applicant: International Business Machines Corporation, Armonk, NY (US)

(72) Inventor: Laurence V. Marks, Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/153,701

(22) Filed: May 12, 2016

(65) Prior Publication Data

US 2016/0262104 A1    Sep. 8, 2016

Related U.S. Application Data (63) Continuation of application No. 13/369,369, filed on Feb. 9, 2012, now Pat. No. 9,344,969.

(51) Int. Cl.
*H04W 52/02*    (2009.01)
*H04W 52/10*    (2009.01)
(Continued)

(52) U.S. Cl.
CPC ....... *H04W 52/0241* (2013.01); *H04W 4/026* (2013.01); *H04W 4/027* (2013.01);
(Continued)

(58) Field of Classification Search
CPC ......... H04W 52/0241; H04W 52/0254; H04W 52/10; H04W 52/367; H04W 52/325;
(Continued)

(56) References Cited

U.S. PATENT DOCUMENTS

| 5,375,254 A | * | 12/1994 | Owen | ................ H04M 1/72511 455/525 |
| 6,999,800 B2 | * | 2/2006 | Peng | ................ H04W 52/0277 455/574 |

(Continued)

OTHER PUBLICATIONS

"An Analysis of Power Consumption in a Smartphone", Aaron Carroll and Gemot Heiser, 2010 Usenix Annual Technical Conference.*

(Continued)

*Primary Examiner* — George Eng
*Assistant Examiner* — Hung Du
(74) *Attorney, Agent, or Firm* — Law Offices of Ira D. Blecker, P.C.

(57) ABSTRACT

A mobile phone initially probes while in an open-loop mode with an estimated power level based on the received power level from a base station. If a response is not received, power is incremented, and a subsequent probe is sent. The process is repeated until a response is received or when maximum power is reached. If a response is still not received, the mobile phone tests for changing its location state. When BTS probes are unsuccessful and maximum power is reached, available sensors are sampled and tested for a change of state, e.g., by way of an inclinometer, an accelerometer, a magnetometer, a GPS, standard 802.11, or employing a Bluetooth, and the like. If no state change is detected, a delay block is entered, reducing the probing rate and the power consumption rate. If a state change is detected, the delay block is bypassed and probing resumes immediately.

20 Claims, 6 Drawing Sheets

(51) Int. Cl.
   *H04W 4/02*   (2018.01)
   *H04W 4/80*   (2018.01)
   *H04W 52/32*  (2009.01)
   *H04W 52/36*  (2009.01)
   *H04W 84/12*  (2009.01)

(52) U.S. Cl.
   CPC ......... *H04W 4/80* (2018.02); *H04W 52/0254* (2013.01); *H04W 52/10* (2013.01); *H04M 2250/10* (2013.01); *H04W 52/325* (2013.01); *H04W 52/367* (2013.01); *H04W 84/12* (2013.01); *Y02D 70/00* (2018.01); *Y02D 70/142* (2018.01); *Y02D 70/144* (2018.01); *Y02D 70/164* (2018.01)

(58) Field of Classification Search
   CPC ..... H04W 4/027; H04W 4/026; H04W 4/008; H04W 4/80; H04W 84/12; Y02D 70/00; Y02D 70/142; Y02D 70/144; Y02D 70/164; H04M 2250/10
   See application file for complete search history.

(56) References Cited

U.S. PATENT DOCUMENTS

| | | | | |
|---|---|---|---|---|
| 7,266,389 B2* | 9/2007 | Karaoguz | ............ | H04B 1/1615 455/556.1 |
| 7,421,291 B2* | 9/2008 | Karaoguz | ............ | H04B 1/1615 455/574 |
| 7,706,772 B2* | 4/2010 | Malcolm | ........... | H04W 52/0241 455/343.4 |
| 2004/0259528 A1* | 12/2004 | Gandhi | ................. | H04W 48/06 455/411 |
| 2007/0004376 A1* | 1/2007 | Kogure | ................. | H04W 28/22 455/343.5 |
| 2009/0059899 A1* | 3/2009 | Bendelac | ............ | H04L 12/5692 370/352 |
| 2009/0131081 A1* | 5/2009 | Abdel-Kader | ........ | H04W 48/16 455/456.6 |
| 2010/0307016 A1* | 12/2010 | Mayor | ................... | G01C 17/38 33/356 |
| 2011/0003590 A1* | 1/2011 | Yoon | ................... | H04W 36/385 455/432.1 |
| 2011/0201335 A1* | 8/2011 | Garrett | ................. | H04W 36/32 455/436 |
| 2011/0312308 A1* | 12/2011 | Willey | ............. | H04M 1/72519 455/414.1 |
| 2012/0083290 A1* | 4/2012 | Jung | ................. | H04W 36/0088 455/456.1 |
| 2012/0190379 A1* | 7/2012 | Hassan | ................. | H04W 24/00 455/456.1 |
| 2013/0130738 A1* | 5/2013 | Cherian | ............. | H04W 52/228 455/522 |
| 2013/0176869 A1* | 7/2013 | Finlow-Bates | ... | H04W 52/0254 370/252 |

OTHER PUBLICATIONS

"Boosting Smartphone Battery Life", Electronic Component News, Monday Sep. 19, 2011.*
"Modem Sensors Greatly Enhance Consumer-Electronic-System Performance", EDN, Sep. 23, 2011.*

* cited by examiner

ENHANCED POWER CONSERVATION FOR MOBILE DEVICES

FIELD OF THE INVENTION

The present invention relates to mobile radio and more particularly to cellular telephony, i.e., mobile radiotelephony.

BACKGROUND AND RELATED ART

The power with which a cellular telephone, also referenced to as a mobile phone, transmits messages regulated by commands from the cellular base station, also referred as a base-transceiver station (BTS), which sets it to a specified level. Regulation occurs to prevent cellular phones near a tower from generating a signal so strong as to interfere with BTS reception from other units located further from the tower. Ideally, all phones will transmit at levels which appear equal at the tower. The transmit power levels are also managed to minimize interference with surrounding cells. This management is well-known in the art, and is described, e.g., in the US Standard for CDMA, TIA/EIA-95B, March 1999, pages 6-5 through 6-12.

Modern mobile phones are designed for power-conservation. They are typically constructed from CMOS circuits which consume significant power only when switching. The processor and many ancillary features are designed with an operational state and one or more low-power "sleep" states where switching rates are reduced or terminated for power conservation. Such phones "wake" periodically to receive and respond to polls from the BTS and to inputs from the user.

Figure 1:
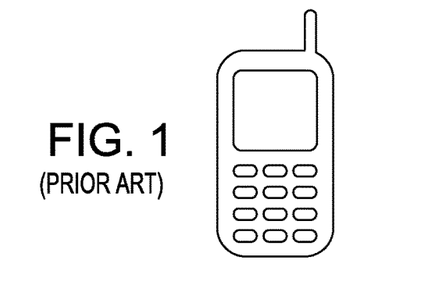
FIG. 1 shows an exemplary prior art mobile phone.

Referring to FIG. 1, for illustrative purposes a conventional mobile phone is shown.

Figure 2:
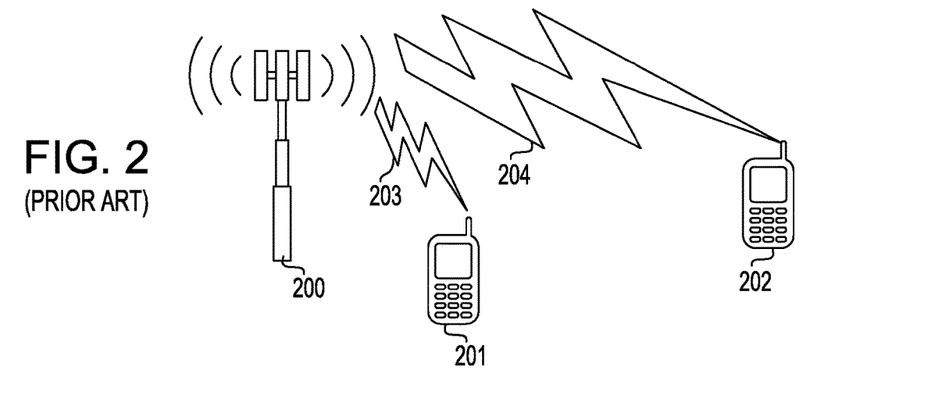
FIG. 2 illustrates an example of two prior art mobile phones at differing distances from a BTS.

FIG. 2 shows two conventional mobile phones (201, 202) at differing ranges from BTS 200. The signal 204 transmitted from mobile phone 202 is transmitted with greater power than signal 203 transmitted from mobile phone 201 located in close proximity to BTS 200. Clearly, the battery of mobile phone 202 will discharge more rapidly than that of mobile phone 201.

Figure 3:
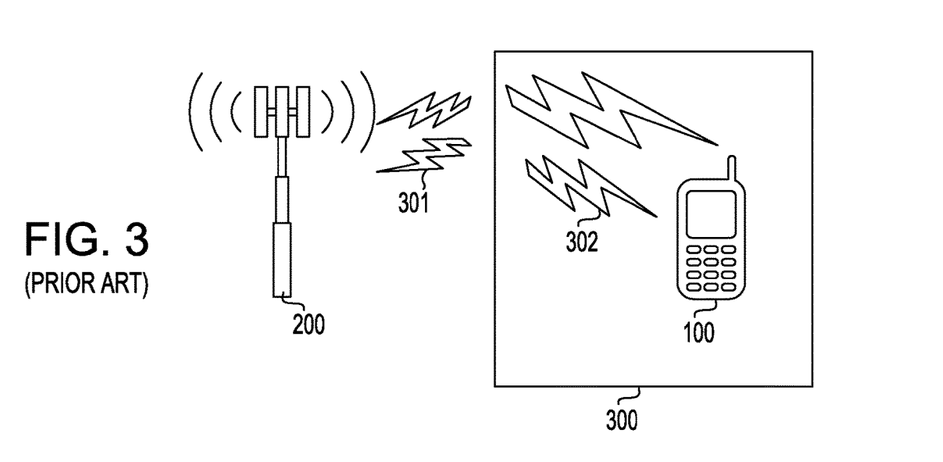
FIG. 3 depicts a mobile phone in a shielded environment, unable to communicate with a BTS as known in the prior art.

FIG. 3 depicts a problem addressed by the present invention. Mobile phone 100 is unable to communicate with BTS 200 due to the influence of shielding 300. BTS signals 301 cannot reach mobile phone 100. The signal 302 of mobile phone 100 does not reach BTS 200 although the mobile phone 100 is transmitting at maximum power while rapidly discharging its battery.

Figure 4:
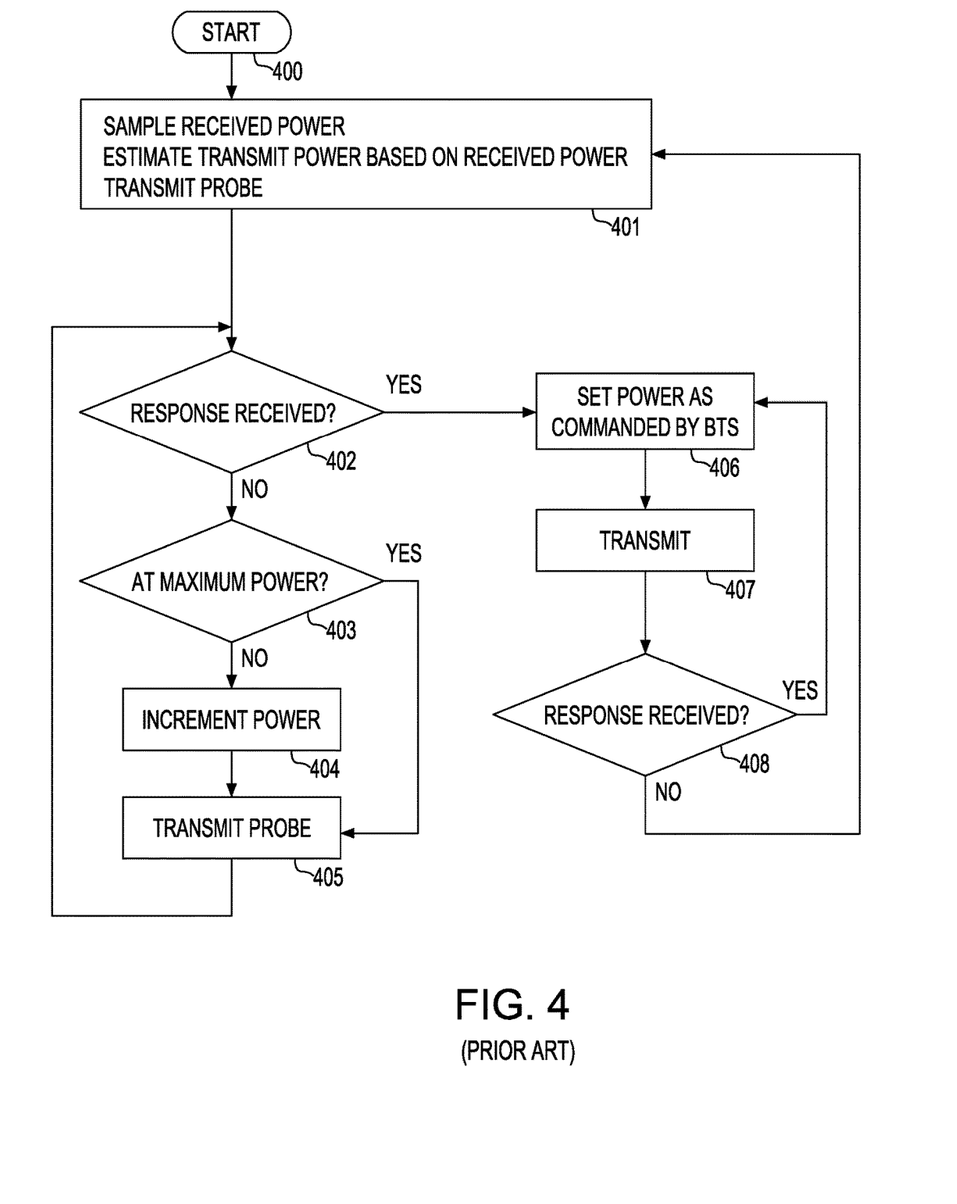
FIG. 4 show an example of a prior art power management as practiced in mobile phones.

FIG. 4 is a flowchart illustrating the operation of conventional mobile phones. When in an open-loop mode, i.e., prior to achieving two-way communication with the BTS, the mobile phone starts probing 401 in the open-loop mode with an estimated power level based on the power level received from the base station. If a response 402 is not received and the mobile phone is not transmitting at maximum power 403, power is incremented 404, and a subsequent probe 405 is transmitted. This process is repeated until a response is received 402, or when maximum power 403 is reached. If maximum power is reached without receiving a response, the mobile phone continues sending probes at maximum power 405. If a response is received, the mobile phone enters a closed-loop mode 406, and transmits at power levels commanded by the BTS 407, as long as contact with BTS is maintained. If the contact with BTS is lost, the mobile phone re-enters the open-loop mode 401.

A variety of sensors may be used, singly or in combination to determine a change in the location of a mobile phone. These include but are not limited to accelerometers, inclinometers, magnetometers, and global positioning systems, all of which sense change in location. Sensors can also detect the presence or absence of local- or personal-area networks, such as IEEE 802.11, defined as a set of standards for implementing wireless local area network (WLAN) computer communication, or Bluetooth (standardized by the Bluetooth Special Interest Group) defined as wireless technology standard for exchanging data over short distances. Generally, a change in reachability to a local network implies a change of location.

The problem addressed by the present invention revolves around a rapid battery drain which occurs when a mobile phone is unable to establish contact with the BTS because it is located too remotely or within a no-reception area such as a shielded building, automotive glove compartment, or steel desk drawer. Users find it extremely frustrating to frequently charge a mobile phone that is not even usable inside an office building, or to take the mobile phone from its storage location in a glove compartment or desk and find it discharged.

Power conservation is an important consideration for mobile phones. The package of every mobile phone carries a rating for battery life in conversation ("talk time") and passive uses.

In a paper entitled "An Analysis of Power Consumption in a Smartphone," Carroll, Aaron and Gernot Heiser, 2010 Usenix Annual Technical Conference it is demonstrated that the greatest consumer of power in a smart mobile phone is the Global System Mobile (GSM), a cellphone standard function. Hence reducing or eliminating this power drain when it is non-productive is the best way to extend the battery charge lifetime.

Presently, the art addresses power management in a device containing electronics modules for a mobile phone, a wireless personal area network, a wireless local area network, and a pager or short message service. The modules may be selectively powered off to extend the battery life. Yet, the present art fails to address reducing the power expended on mobile phone service without regard to other services.

Although the industry is aware of the desirability of robust power conservation, no solution has been developed which deterministically addresses the technique of quiescing (napping) based on the absence of a signal received.

Accordingly, there is a long-felt need for a reliable, deterministic way to determine when to quiesce the mobile phone, and more importantly, when to restore it to normal operation. This problem has not been addressed in the industry, and neither have approaches to power conservation been considered by determining and using information related to the phone's location.

SUMMARY

In one aspect, the invention provides a method for conserving power by minimizing or ceasing useless power-expensive probes when a base-transceiver station BTS is unreachable and instead uses power-miserly sampling of device location.

Power conservation can be achieved by multiple means. Non-productive mobile phone probes are minimized or eliminated. Power is also not consumed in generating such probes and attempting receipt of responses. It is even possible to use a very low-power processor to sample the location sensors while quiescing the processors normally used.

In one embodiment, the present invention provides a method for enabling a mobile phone to achieve the quiescent state. The method makes it possible for mobile phones to sense a physical location through a plurality of locating means, including global positioning systems (GPS), E911 locators, and the like. In another embodiment, the mobile phones can detect changes in orientation through signals provided by internal magnetometers.

In another embodiment, the mobile phones detect changes in position through signals provided preferably by internal accelerometers and inclinometers and infer position changes by changes in availability of short-range radio-frequency signals, including those provided by IEEE 802.11 local area networks (LANs) or Bluetooth personal area networks (PANs).

In yet another embodiment, the mobile phone detects that it is unable to communicate with BTS when using its highest transmission power. It then ceases the power-consuming attempt and begins an economical polling, preferably at a slow rate of one or more location sensors as listed above. The mobile phone enters a power-conserving quiescent state between such polls.

In a further embodiment, once a motion or position change is detected or inferred, the mobile phone resumes normal attempts to achieve communication with the BTS, and in the absence thereof, if communication is again unachievable the quiescent state is resumed.

In still another embodiment, a method is provided for a mobile phone achieving a quiescent state, the method including: having the mobile phone probe while in an open-loop mode, failing to receive a response from a base-transceiver station (BTS) within a predetermined time; upon receiving no response, sampling sensors to reduce probing rate and power consumption rate, and test for a state change; if no state change is detected, invoking a variable delay coupled to the sensors; and bypassing the delay and resuming the probing when the state change is detected.

BRIEF DESCRIPTION OF THE DRAWINGS

The present invention will be understood and appreciated more fully from the following detailed description of the invention, taken in conjunction with the accompanying drawings of which.

DETAILED DESCRIPTION

Detailed embodiments of the present invention are disclosed hereinafter. It is to be understood that they are merely illustrative of the invention that may be embodied in various forms. In addition, each of the examples given in connection with the various aspects of the invention is intended to be illustrative, and not restrictive. Therefore, specific structural and functional details disclosed herein are not to be interpreted as limiting, but merely as a representative basis for teaching one skilled in the art to variously employ the present invention.

Figure 5:
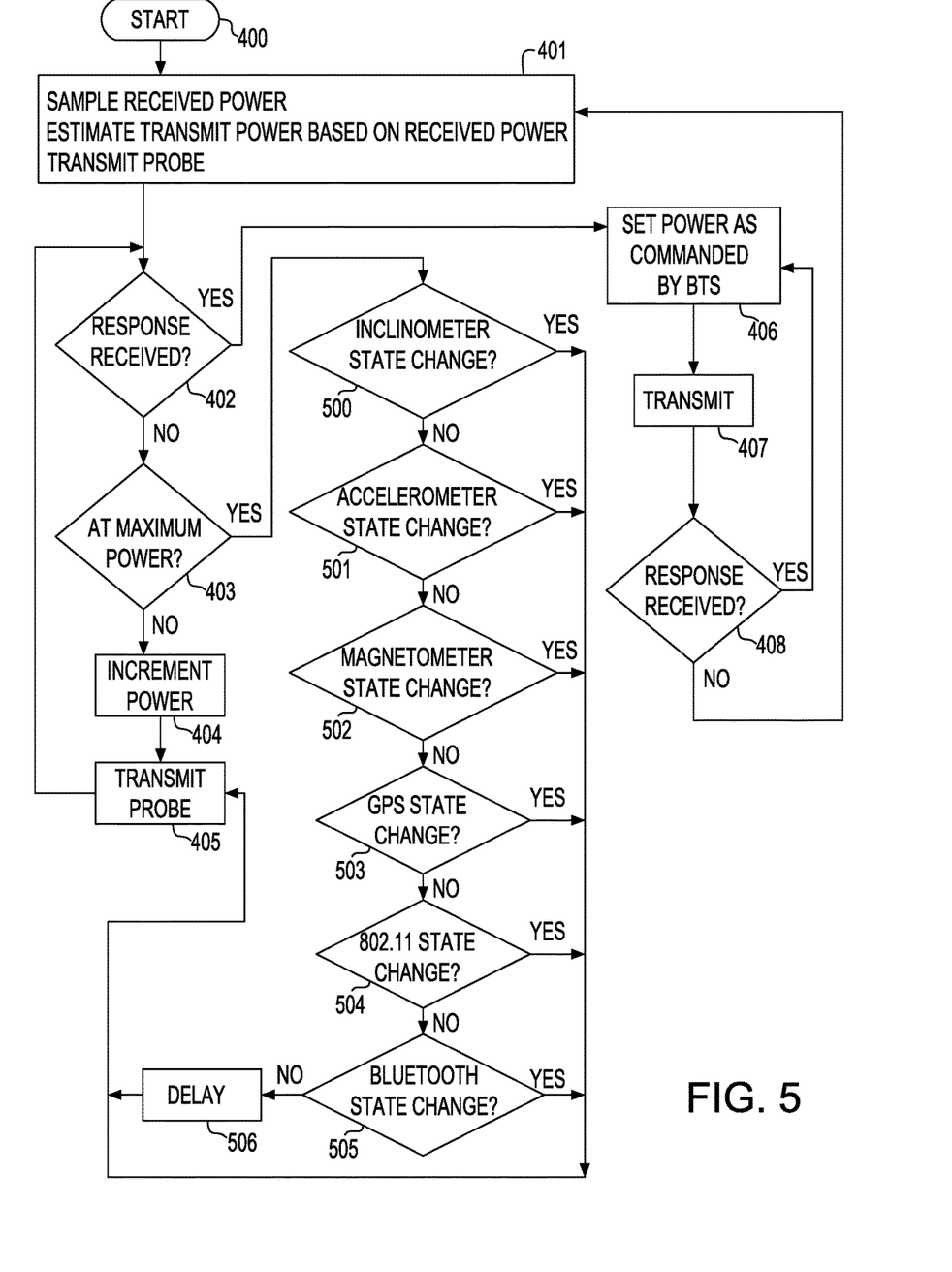
FIG. 5 illustrates power management and conservation of a mobile phone, according to an embodiment of the present invention.

Referring to FIG. 5, a flowchart illustrates an exemplary operation of an embodiment of the present invention. As previously described, the mobile phone initially starts probing 401 (see FIG. 4), in open-loop mode with an estimated power level based on the received power level from the base station. If a response 402 is not received and the mobile phone is not transmitting at maximum power 403, the power is incremented 404, and a subsequent probe is then sent 405. This process is repeated until a response is received 402, or maximum power is reached 403. If the maximum power is reached without receiving a response, the mobile phone begins testing for a change in its location state. It can be assumed that if the mobile phone and BTS cannot achieve communication when the mobile phone is at a particular location, that communication will not become available unless the mobile phone is relocated. When probes of the BTS are unsuccessful and maximum power 403 is reached, available sensors are sampled and tested for a change of state, e.g., by way of one or more of inclinometer 500, accelerometer 501, magnetometer 502, GPS 503, standard 802.11 504, employing a Bluetooth 505, and the like. If no state change is detected, delay block 506 is activated, serving the purpose of reducing the probing rate, and accordingly the power consumption rate. If a state change is detected, delay block 506 is bypassed and probing resumes immediately. The degree of delay may be predetermined. Longer values of delay conserve more power but reduce its responsiveness to state changes.

The sequence in which sensors are sampled is arbitrary. Sampling in orders other than that those illustrated in FIG. 5 and discussed herein are equally useful. The set of sensors shown in FIG. 5 is intended to be exemplary and not restrictive in any way. Sensors can be interchanged by others, such as, for instance, gyroscopic sensors, that can be added. The invention is functional with even one single sensor.

State change detection performed by blocks 500, 501, 502, 503, 504, and 505 is now discussed in greater detail.

Detection of a change in location is similar regardless of the type of sensor input. In each case a new sample is compared to the preceding sample. If there is a difference, a location change is presumed to have taken place. This can be, e.g., a difference between two successive inclinometer samples indicating that the device orientation has changed or the appearance of a IEEE 802.11 network not present on the previous sample is now detected, or conversely when experiencing the disappearance of a previously-detected IEEE 802.11 signal.

Figure 6:
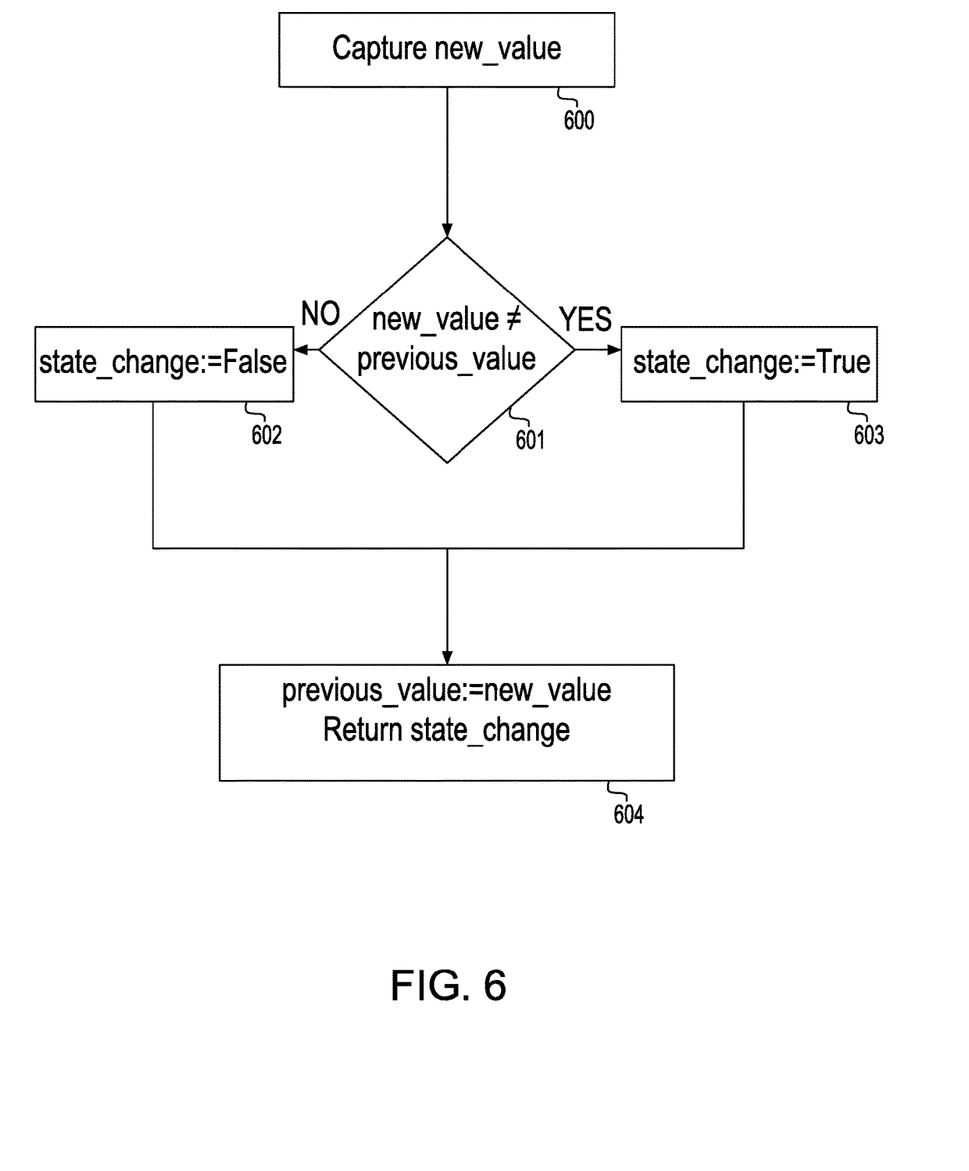
FIG. 6 shows the detection of environmental state changes from which a change in location can be inferred, in accordance with an embodiment of the present invention.

Referring now to FIG. 6, a new sample of the signal to be tested is captured 600 as a new value. The new value 601 is compared to the previous value of the signal. Responsive to the test, a variable state change is set either to False 602 or True 603. The newly sampled value, (referenced as the new-_value), is stored as the previous value and the value of state change is returned 604.

Figure 7:
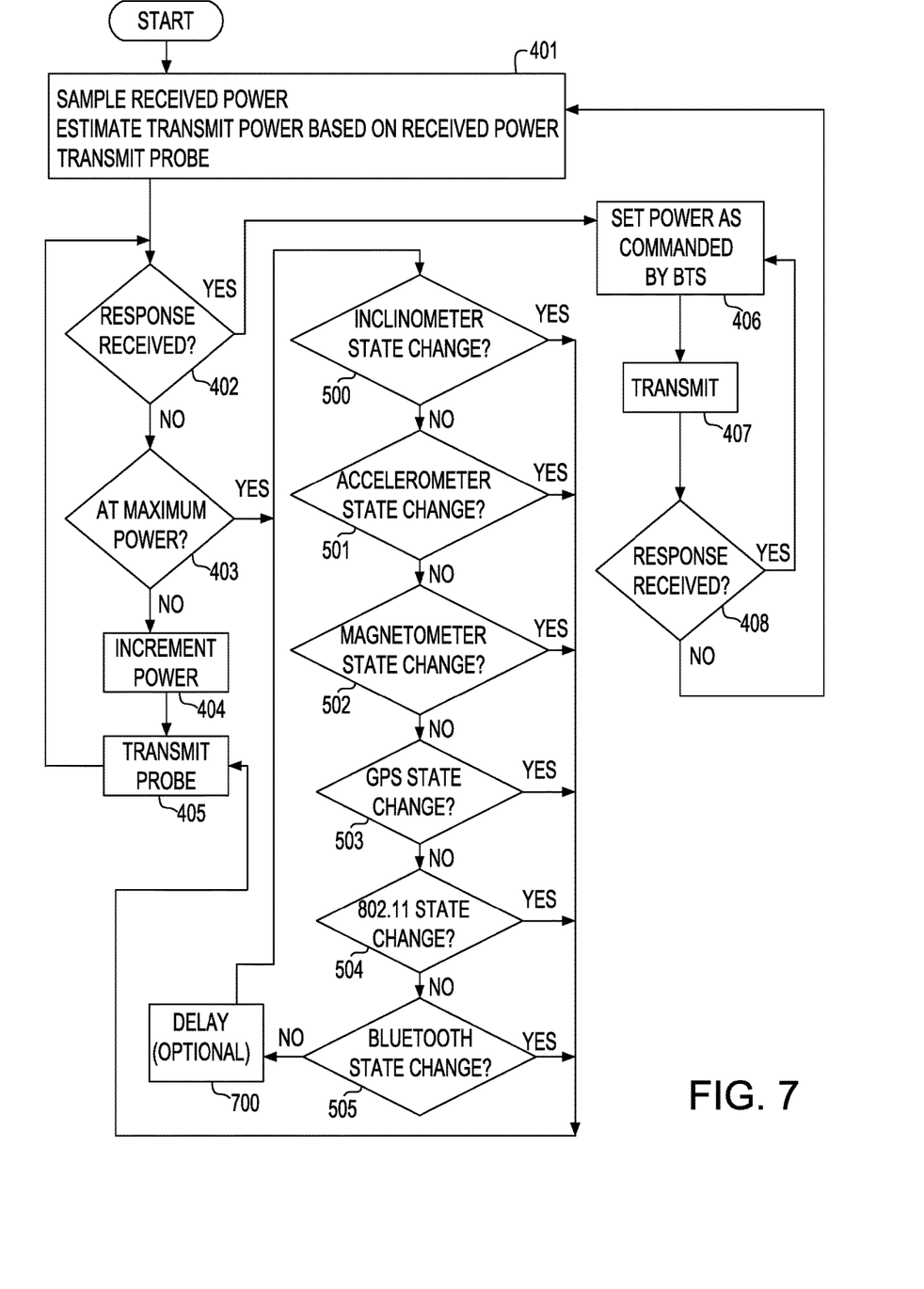
FIG. 7 depicts an alternate power management and conservation practiced in a mobile phone, according to an embodiment of the invention.
Figure 8:
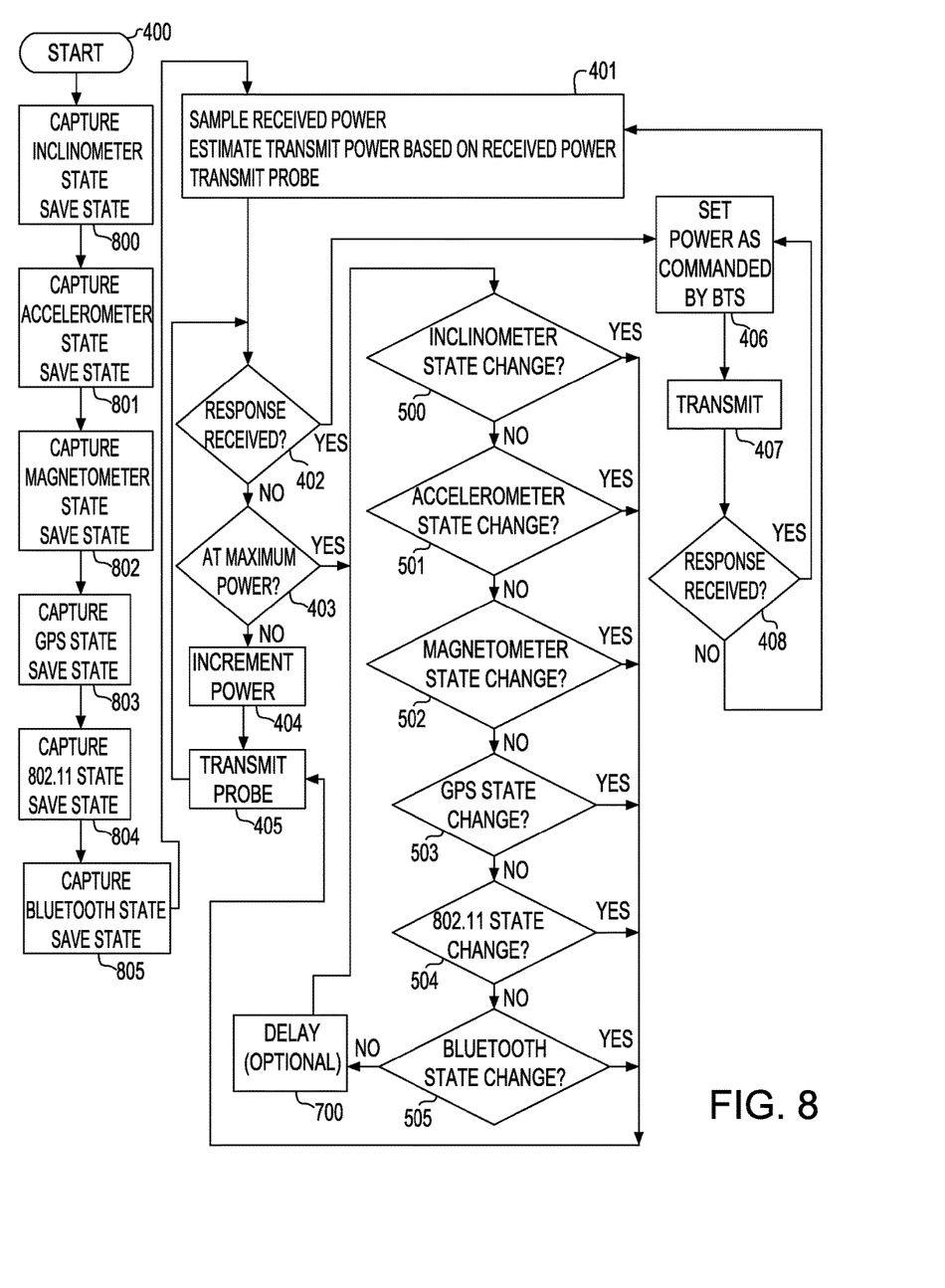
FIG. 8 depicts the power management and conservation shown in FIG. 5 with added initialization logic.

For reasons of clarity, initialization of the state detection logic of FIGS. 5, 6, and 7 is not shown. As a result, the first time each detector is sampled, it may falsely indicate a state change and result in an additional probe. The invention is functional as shown and the additional probes will not consume substantial power. FIG. 8 depicts the logic shown in FIG. 5 with initialization added.

In an alternate embodiment shown with reference to FIG. 7, it may be observed that it differs from the embodiment shown in FIG. 5 in that the latter conserves power by probing at a reduced rate when no response is received to maximum power probes. The embodiment depicted in FIG. 7, on the other hand, performs no power-expensive probes when the maximum power probe fails. Once this condition is reached 700, continuing checks for location change are made. The delay provides for a range of choices on a scale between maximum power conservation and maximum responsiveness. This value could be static or varied over time. One scheme would initially provide a short delay for responsiveness, but increase over time to provide best power conservation.

FIGS. 5 and 7 demonstrate resumption of probes once any sensor indicates a change from its previous state. As an alternate embodiment, it may be desirable to evaluate the results of multiple sensors before resuming probing. This can be advantageous, particularly in the case of an individual carrying a mobile phone on his person inside a shielded building with a wireless network. Resumption of probes based on motion (inclinometer or accelerometer sensing) would needlessly expend power, but qualifying this detection with a loss of sensing the wireless network can achieve the desired result of conserving power.

Additional embodiments include schemes similar to those shown in FIGS. 5 and 7. In these embodiments, if a sensor repeatedly changes state but probes to the base station do not elicit a response, that sensor is ignored or not further polled until another sensor changes state or until a response is received from the BTS in response to a probe triggered by change of state of another sensor.

While the present invention has been particularly described in conjunction with exemplary embodiments, it is evident that many alternatives, modifications and variations will be apparent to those skilled in the art in light of the present description. It is therefore contemplated that the appended claims will embrace any such alternatives, modifications and variations as falling within the scope and spirit of the present invention. It should be understood, however, that the description, while indicating preferred embodiments of the invention and numerous specific details thereof, is given by way of illustration and not of limitation. Many changes and modifications can be made within the scope of the present invention without departing from the spirit thereof, and the invention includes all such modifications.

What is claimed is:

1. A method for sensing a change in location of a mobile device, the method comprising:
    probing by a mobile device a base-transceiver station (BTS) while in an open-loop mode, and responsive to the probing, failing to receive a response from the BTS within a predetermined time;
    upon receiving no response from the BTS and when the mobile device is transmitting at a maximum power of the mobile device, completely ceasing probing the BTS at any power level while testing one or more sensors to sense for a change in location of the mobile device with respect to the BTS according to the following process:
        (i) sampling the one or more sensors to collect a first set of samples corresponding to said one or more sensors, said one or more sensors comprises one or more of an inclinometer, accelerometer, magnetometer, global positioning system (GPS), wireless signals received from a Local Area Network (LAN), gyroscope, and short-range wireless signal;
        (ii) re-sampling said one or more sensors to collect a second set of samples corresponding to said one or more sensors, and comparing values of said first set of samples to values of said second set of samples to detect a difference thereof with respect to any one of said one or more sensors;
        (iii) activating a predetermined time delay when said comparing values of said first set of samples to values of said second set of samples reveals no difference with respect to all of said one or more sensors;
        (iv) after the predetermined time delay, re-sampling said one or more sensors to collect a new set of samples corresponding to said one or more sensors and comparing values of the new set of samples with preceding sampled values corresponding to said one or more sensors sampled since completely ceasing probing the BTS at any power level to detect a difference thereof with respect to any of said one or more sensors;
        (v) when comparing values of the new set of samples corresponding to the one or more sensors with the preceding sampled values reveals no difference with respect to all of said one or more sensors, activating the predetermined time delay and repeating steps (iv) and (v) until a difference between the new set of values of the samples of any of the one or more sensors and the preceding sampled values is obtained, wherein the predetermined time delay increases each time steps (iv) and (v) are repeated; and
    resuming probing said BTS only when said difference for any of said one or more sensors is detected.

2. The method of claim 1 wherein at least two sensors are sensed to sense for a change in location of the mobile device and sampling and re-sampling is with respect to the at least two sensors.

3. A method for sensing a change in location of a mobile device, the method comprising:
    probing by a mobile device a base-transceiver station (BTS) while in an open-loop mode, and responsive to the probing, failing to receive a response from the BTS within a predetermined time;
    upon receiving no response from the BTS and when the mobile device is transmitting at a maximum power of the mobile device, completely ceasing probing the BTS at any power level while testing one or more sensors to sense for a change in location of the mobile device with respect to the BTS according to the following process:
        (i) sampling the one or more sensors to collect a first set of samples corresponding to said one or more sensors, said one or more sensors comprises one or more of an inclinometer, accelerometer, magnetometer, global positioning system (GPS), wireless signals received from a Local Area Network (LAN), gyroscope, and short-range wireless signal;
        (ii) re-sampling said one or more sensors to collect a second set of samples corresponding to said one or more sensors, and comparing values of said first set of samples to values of said second set of samples to detect a difference thereof with respect to any one of said one or more sensors;
        (iii) saving values of the second set of samples of the one or more sensors as preceding sampled values;
        (iv) activating a predetermined time delay when said comparing values of said first set of samples to values of said second set of samples reveals no difference with respect to all of said one or more sensors;

(v) after the predetermined time delay, re-sampling said one or more sensors to collect a new set of samples corresponding to said one or more sensors and comparing values of the new set of samples with the preceding sampled values to detect a difference thereof with respect to any one of said one or more sensors;

(vi) saving values of the new set of samples as preceding sampled values which replace any previous preceding sampled values;

(vii) when comparing values of the new set of samples corresponding to the one or more sensors with the preceding sampled values reveals no difference with respect to all of said one or more sensors, activating the predetermined time delay and repeating steps (v) to (vii) until a difference between the new set of values of the samples of any one of the one or more sensors and the preceding sampled values is obtained, wherein the predetermined time delay increases each time steps (v) to (vii) are repeated; and resuming probing said BTS only when said difference for said one or more sensors is detected.

4. The method of claim 3 wherein at least two sensors are sensed to sense for a change in location of the mobile device and sampling and re-sampling is with respect to the at least two sensors.

5. The method as recited in claim 3, wherein a quiescent state resumes if communication is not achievable.

6. The method as recited in claim 3 further comprising using a low power processor for sampling the sensors while quiescing other processors used.

7. The method as recited in claim 3, further comprising incrementing said power until reaching maximum power or until receiving said response.

8. The method as recited in claim 3, further comprising when said mobile device and BTS do not achieve communication when said mobile device is at a particular location, relocating said mobile device to another location.

9. The method as recited in claim 3, wherein said mobile device detects changes in orientation through signals provided by the magnetometer.

10. The method as recited in claim 3, wherein said mobile device detects position changes through signals provided by the accelerometer or the inclinometer.

11. The method of claim 3 further comprising initializing the one or more sensors prior to step (i).

12. A method for sensing a change in location of a mobile device, the method comprising in the following order:

probing by a mobile device a base-transceiver station (BTS) while in an open-loop mode, and responsive to the probing, failing to receive a response from the BTS within a predetermined time;

upon receiving no response from the BTS and when the mobile device is transmitting at a maximum power of the mobile device, completely ceasing probing the BTS at any power level while testing one or more sensors to sense for a change in location of the mobile device with respect to the BTS:

(i) sampling the one or more sensors to collect a first set of samples corresponding to said one or more sensors, said one or more sensors comprises one or more of an inclinometer, accelerometer, magnetometer, global positioning system (GPS), wireless signals received from a Local Area Network (LAN), gyroscope and short-range wireless signal;

(ii) re-sampling said one or more sensors to collect a second set of samples corresponding to said one or more sensors, and comparing values of said first set of samples to values of said second set of samples to detect a difference thereof;

(iii) saving values of the second set of samples of the one or more sensors as preceding sampled values;

(iv) activating a predetermined time delay when said comparing values of said first set of samples to values of said second set of samples reveals no difference with respect to all of said one or more sensors;

(v) after the predetermined time delay, re-sampling said one or more sensors to collect a new set of samples corresponding to said one or more sensors and comparing values of the new set of samples with the preceding sampled values to detect a difference thereof with respect to any one of said one or more sensors;

(vi) saving values of the new set of samples as preceding sampled values which replace any previous preceding sampled values;

(vii) when comparing values of the new set of samples corresponding to the one or more sensors with the preceding sampled values reveals no difference with respect to all of said one or more sensors, activating the predetermined time delay and repeating steps (v) to (vii) until a difference between the new set of values of the samples of any one of the one or more sensors and the preceding sampled values is obtained, wherein the predetermined time delay increases each time steps (v) to (vii) are repeated; and resuming probing said BTS only when said difference for any of said one or more sensors is detected.

13. The method of claim 12 wherein at least two sensors are sensed to sense for a change in location of the mobile device and sampling and re-sampling is with respect to the at least two sensors.

14. The method as recited in claim 12, wherein a quiescent state resumes if communication is not achievable.

15. The method as recited in claim 12 further comprising using a low power processor for sampling the sensors while quiescing other processors used.

16. The method as recited in claim 12, further comprising incrementing said power until reaching maximum power or until receiving said response.

17. The method as recited in claim 12, further comprising when said mobile device and BTS do not achieve communication when said mobile device is at a particular location, relocating said mobile device to another location.

18. The method as recited in claim 12, wherein said mobile device detects changes in orientation through signals provided by the magnetometer.

19. The method as recited in claim 12, wherein said mobile device detects position changes through signals provided by the accelerometer or the inclinometer.

20. The method of claim 12 further comprising initializing the one or more sensors prior to step (i).

* * * * *